United States Patent
Hashimoto

(10) Patent No.: US 7,530,536 B2
(45) Date of Patent: May 12, 2009

(54) CLAMP

(75) Inventor: Takeshi Hashimoto, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 11/631,523

(22) PCT Filed: Jul. 4, 2005

(86) PCT No.: PCT/IB2005/002132

§ 371 (c)(1),
(2), (4) Date: Jan. 4, 2007

(87) PCT Pub. No.: WO2006/011031

PCT Pub. Date: Feb. 2, 2006

(65) Prior Publication Data

US 2008/0017761 A1    Jan. 24, 2008

(30) Foreign Application Priority Data

Jul. 23, 2004    (JP)    .............................. 2004-216303

(51) Int. Cl.
*F16L 3/22*    (2006.01)
(52) U.S. Cl. ...................... 248/68.1; 248/74.4; 211/59.4
(58) Field of Classification Search ................ 248/68.1, 248/74.4; 211/59.4
See application file for complete search history.

(56) References Cited

U.S. PATENT DOCUMENTS

| | | | | |
|---|---|---|---|---|
| 2,354,919 A | * | 8/1944 | Lockwood | 248/68.1 |
| 2,355,742 A | * | 8/1944 | Morehouse | 248/68.1 |
| 2,361,943 A | * | 11/1944 | Issoglio et al. | 174/135 |
| 2,404,531 A | * | 7/1946 | Robertson | 248/68.1 |
| 3,592,427 A | * | 7/1971 | Misuraca | 248/68.1 |
| 5,060,810 A | * | 10/1991 | Jones | 211/59.4 |
| 5,098,047 A | * | 3/1992 | Plumley | 248/68.1 |
| 5,184,794 A | | 2/1993 | Saito | |
| 6,193,195 B1 | * | 2/2001 | Owens | 248/68.1 |
| 6,308,921 B1 | * | 10/2001 | Borzucki | 248/68.1 |
| 6,902,138 B2 | * | 6/2005 | Vantouroux | 248/68.1 |

FOREIGN PATENT DOCUMENTS

| | | |
|---|---|---|
| EP | 0 638 756 A1 | 2/1995 |
| GB | 1 014 448 A | 12/1965 |
| JP | 06-006253 | 2/1994 |
| JP | 2003-329173 A | 11/2003 |

* cited by examiner

*Primary Examiner*—Anita M King
(74) *Attorney, Agent, or Firm*—Kenyon & Kenyon LLP

(57) ABSTRACT

In a clamp having a pair of clamp members which sandwich a plurality of pipes having cylindrical cross-sections of different diameters, each of the clamp members including an elastic body having a plurality of concave portions formed therein and a reinforcing plate fixed to an outer side surface of the elastic body, the dimensions of each portion of the elastic bodies are set such that the compression ratio of the elastic bodies with respect to all of the pipes is made the same. For example, when the diameters of two pipes having different outer diameters are made D1 and D2, the curvature radii of the concave portions of the elastic bodies are made R1 and R2, and the distances from mating faces of the elastic bodies to the reinforcing plates are made L11, ..., L22, then the dimensions of each portion of the elastic bodies are set so as to satisfy the relationship $[(D1-2R1)/(L11+L12-2R1)]=(D2-2R2)/(L21+L22-2R2)$.

4 Claims, 9 Drawing Sheets

CLAMP

INCORPORATION BY REFERENCE

This is a 371 national phase application of PCT/IB20056/002132 filed 4 Jul. 2005, claiming priority to Japanese Patent Application No. 2004-216303 filed 23 Jul. 2004, the contents of which are incorporated herein by reference.

FIELD OF THE INVENTION

The invention relates to a clamp which holds a pipe through which a fluid flows in a fuel system, brake system, cooling system, or the like in an automobile or the like. More particularly, the invention relates to a clamp that is suitable for preventing vibrations from reaching a plurality of pipes by connecting and holding the pipes.

BACKGROUND OF THE INVENTION

Pipes such as fuel pipes, brake pipes, and cooling system pipes are typically disposed in an engine room and the like of an automobile. These pipes are subject to vibrations of the automobile. In order to prevent those vibrations from reaching the pipes, a method has been employed in which the pipes are held by clamps.

One related pipe clamp is a resin clamp structured such that a clamp body is formed integrally with a pipe holding portion. The clamp sandwiches the pipe, such as a fuel pipe, at that pipe holding portion.

Also, Japanese Utility Model Publication No. 6-6253, for example, proposes a clamp that includes a pair of clamp members that sandwich a plurality of pipes. This clamp is structured such that each clamp member includes an elastic body having a plurality of concave portions formed therein and a reinforcing plate that is fixed to an outer side surface of this elastic body. The pair of clamp members are then aligned with the pipes arranged in the concave portions of the elastic bodies such that the plurality of pipes are fixed in place at the concave portions. The clamp according to Japanese Utility Model Publication No. 6-6253 is structured to fix and hold a plurality of pipes at concave portions in an elastic body, thus making it possible to damp vibrations acting on the held pipes.

A clamp of a structure that holds pipes at concave portions in an elastic body, such as that described above, works fine as long as the plurality of pipes all have the same outer diameter. If the plurality of pipes have different outer diameters, however, the pipes may become deformed as a result of the conditions such as the compressibility of the elastic body and the tightening allowance [(pipe diameter)-(concave portion diameter)]. Furthermore, the vibration absorption effect may not be able to be achieved.

For example, when holding a plurality of pipes having different outer diameters using a clamp of a structure which holds the pipes at concave portions of an elastic body, for example, the tightening allowance for each pipe is the same. Therefore, when that tightening allowance is a dimension appropriate for a large diameter pipe, then less force is applied to a small diameter pipe such that the hold of the clamp becomes loose. As a result, the vibration absorption effect may be reduced. If, on the other hand, the tightening allowance is appropriate for the small diameter pipe, then the force applied to a large diameter pipe ends up being excessive, possibly resulting in deformation of the large diameter pipe. There is also a possibility of the small diameter pipe becoming deformed depending on amount of compression of the elastic body.

Moreover, if the tightening allowance is the same for each pipe, the decrease in binding force between pipes of different diameters may become uneven if the pipes settle on the elastic body as it deteriorates over time. As a result, the hold of the clamp on the large diameter or small diameter pipe would become loose, such that the vibration absorption effect would no longer be able to be achieved.

DISCLOSURE OF THE INVENTION

The invention thus aims to provide a clamp which, when holding a plurality of pipes having different outer diameters, is able to hold all of the pipes with appropriate clamping force such that there is no fear of the pipes deforming, and is also able to achieve an excellent vibration absorption effect.

The invention therefore provides a clamp having a pair of clamp members which sandwich a plurality of pipes having cylindrical cross-sections, each of the clamp members including an elastic body having a plurality of concave portions and a reinforcing plate fixed to an outer side surface of the elastic body, the clamp structured to hold the plurality of pipes at the plurality of concave portions by aligning the pair of clamp members while the pipes are arranged in the concave portions of the elastic bodies. When a diameter of a $n^{th}$ (n=a positive integer (1, 2, 3, ...)) pipe, from among the plurality of pipes, is denoted by reference character Dn, a curvature radius of the concave portion which holds the $n^{th}$ pipe is denoted by reference character Rn, and distances, in a direction orthogonal to mating faces of the elastic bodies through a pipe holding center of a $n^{th}$ concave portion, from the mating faces of the elastic bodies to inner side surfaces of a pair of reinforcing plates are denoted by reference characters Ln1 and Ln2, respectively, the compression ratio of the elastic bodies satisfies the relationship $[(D1-2R1)/(L11+L12-2R1)=(D2-2R2)/(L21+L22-2R2)=\ldots=(Dn-2Rn)/(Ln1+Ln2-2Rn)]$.

The details of the invention will hereinafter be described.

First, the invention was achieved by the discovery of the conditions for obtaining an excellent vibration absorption effect without the pipes deforming or the elastic bodies loosening when connecting and holding a plurality of pipes having different outer diameters, in a clamp which uses elastic bodies having concave portions formed therein. When the diameter of the pipes is made Dn, the curvature radius of the concave portions of the elastic bodies is made Rn, and the distances from the mating faces of the elastic bodies to the reinforcing plates are made Ln1 and Ln2, the relationship of $[(D1-2R1)/(L11+L12-2R1)=(D2-2R2)/(L21+L22-2R2)=\ldots=(Dn-2Rn)/(Ln1+Ln2-2Rn)]$ is satisfied, as described above, i.e., that the dimensions of each portion of the elastic bodies are set not so that the tightening allowance is the same for all of the pipes, but rather so that the compression ratio of the elastic bodies is the same for all of the pipes with different diameters.

Making the compressibility of the elastic bodies with respect to all of the pipes having different diameters the same in this way enables an appropriate clamping force to be obtained for all of the pipes without too much or too little stress being applied to the pipes of different diameters. As a result, the pipes will not be deformed. Moreover, even if settling of the elastic bodies occurs due to deterioration over time, the decrease in binding force caused by that settling of the elastic bodies would be uniform for all of the pipes, such that the clamp hold would not loosen.

In this case, in the clamp of the invention, the material of the elastic bodies is not particularly limited. However, when used on pipes in the fuel system or the like, a strong clamping force is required so it is preferable to use a rubber such as chloroprene rubber for the elastic bodies.

According to the invention, in a clamp which includes a pair of clamp members that sandwich a plurality of pipes, each clamp member including an elastic body having a plurality of concave portions formed therein and a reinforcing plate fixed to the outer side surface of the elastic body, when holding a plurality of pipes having different outer diameters, the dimensions of each portion of the elastic bodies are set so that the compression ratio of the elastic bodies is the same for all of the pipes. As a result, all of the pipes are able to be uniformly held with an appropriate clamping force so that the pipes will not deform. Moreover, the binding force will not decrease in one area more than in another even if settling of the elastic bodies occurs due to deterioration over time. As a result, a good clamping state is able to be maintained over an extended period of time.

DETAILED DESCRIPTION OF THE PREFERRED EMBODIMENTS

Exemplary embodiments of the invention will hereinafter be described with reference to the appended drawings.

First Embodiment

Figure 1:
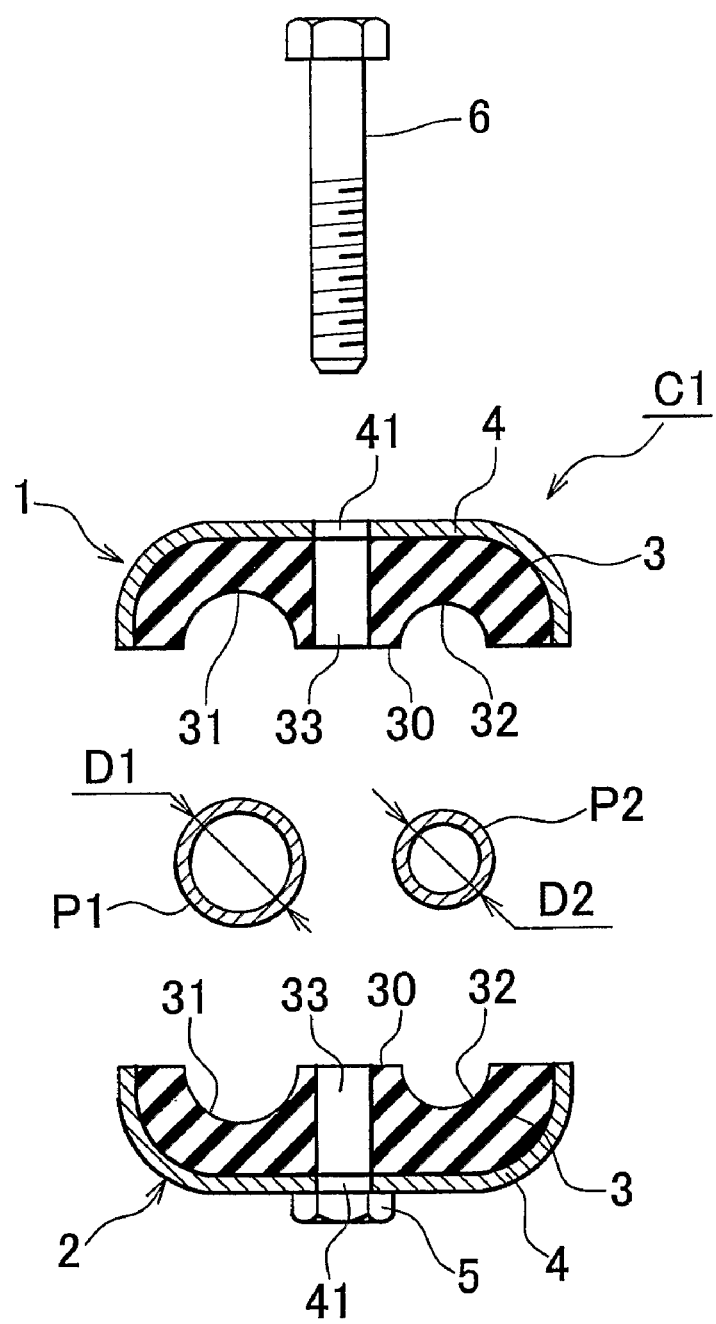
FIG. 1 is a vertical cross-sectional view illustrating a clamp according to a first exemplary embodiment of the invention in a disassembled state.
Figure 2:
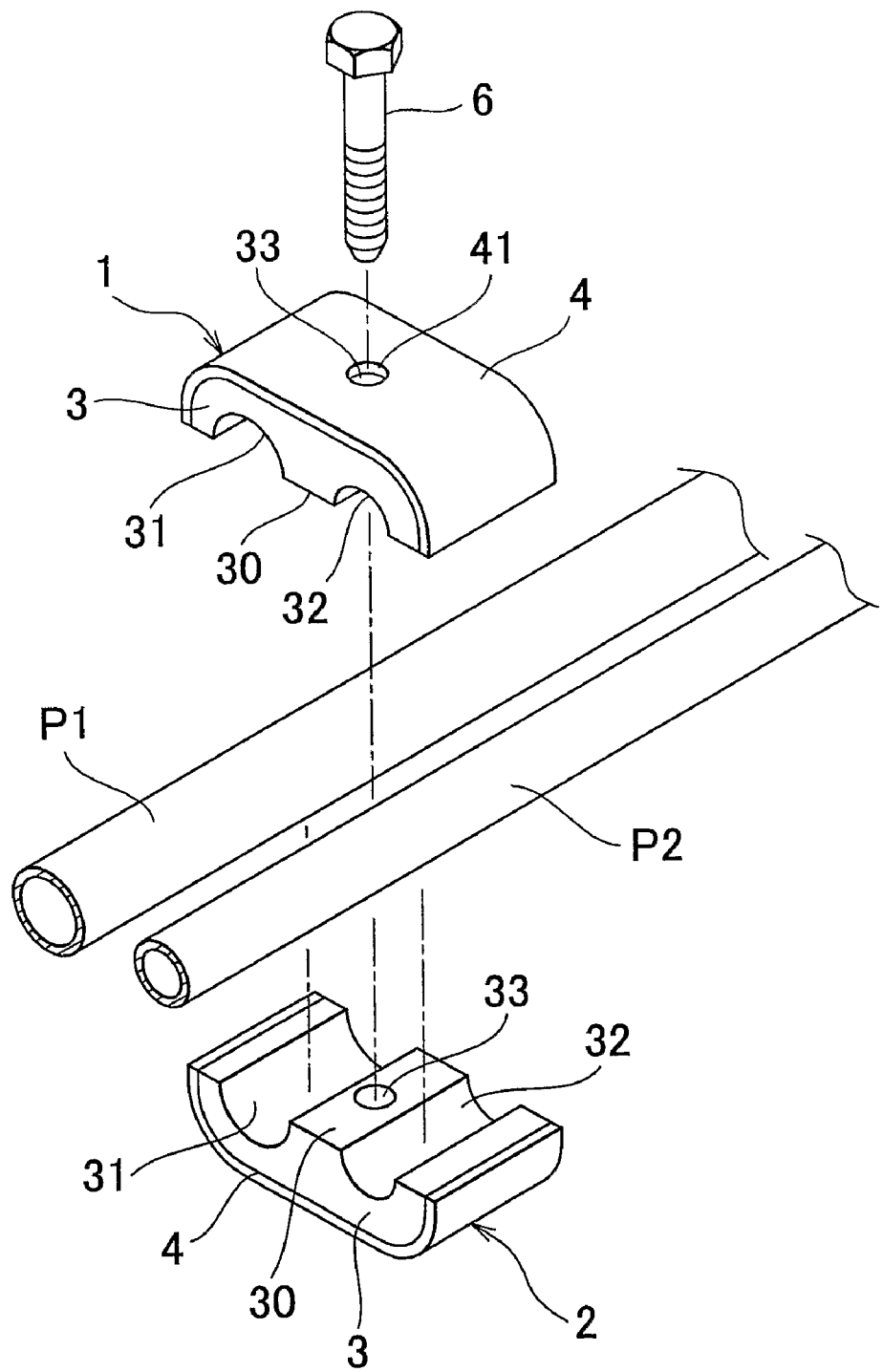
FIG. 2 is an exploded perspective view of the clamp shown in FIG. 1.
Figure 3:
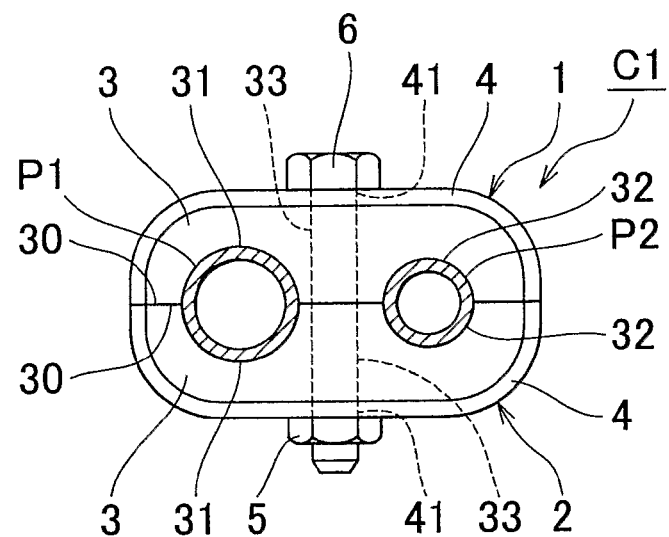
FIG. 3 is a front elevational view illustrating the clamp shown in FIG. 1 as it is used.
Figure 4:
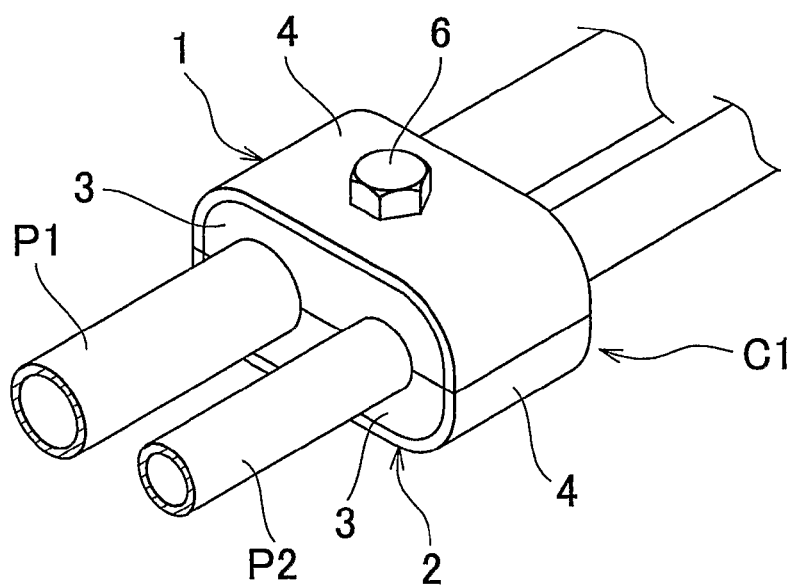
FIG. 4 is a perspective view illustrating the clamp shown in FIG. 1 as it is used.

FIG. 1 is a vertical cross-sectional view illustrating a clamp according to a first exemplary embodiment of the invention in a disassembled state. FIG. 2 is an exploded perspective view of that clamp. FIG. 3 is a front elevational view, and FIG. 4 is a perspective view, illustrating the clamp shown in FIG. 1 as it is used.

The clamp in this example is a clamp C1 which holds pipes such as fuel pipes and brake pipes in an automobile. The clamp C1 includes a pair of clamp members 1 and 2 which sandwich two pipes P1 and P2 having different diameters. Each clamp member 1 and 2 includes an elastic holding body 3 and a reinforcing plate 4.

Each elastic holding body 3 and 3 is a manufactured product of chloroprene rubber. These two elastic holding bodies 3 and 3 are both formed symmetrical such that overall a generally rectangular block shaped member is formed when mating faces 30 of the elastic holding bodies 3 and 3 are matched up with each other. Two semi-circular concave portions 31 and 32 having different curvature radii are formed parallel to one another in the mating face 30 of each elastic holding body 3 and 3. When these two elastic holding bodies 3 and 3 are put together, circular holes are formed for fitting and holding two pipes P1 and P2 of large and small diameters, respectively. Also, a through hole 33 through which a bolt is inserted is formed in a center portion of each of the elastic holding bodies 3 and 3.

Each reinforcing plate 4 and 4 is a member that is formed bent in a general U-shape which is fixed with an adhesive to an outer side surface of the elastic holding body 3. A through hole 41 through which a bolt is inserted is formed in a center portion of each reinforcing plate 4 and 4. Of these two reinforcing plates 4 and 4, a nut 5 is fixed by welding to the center portion of the outer surface of one of the reinforcing plates 4 (the reinforcing plate 4 of the clamp member 2 that is on the bottom in FIG. 1). The centers of the through holes 41 in the reinforcing plates 4 and the center of the nut 5 are substantially aligned with the centers of the through holes 33 in the elastic holding bodies 3 and 3 described above.

In this example, the curvature radii of the concave portions 31 and 32 of the elastic holding bodies 3 and 3 are made smaller than the radii of the pipes P1 and P2, respectively. Binding force on the pipes P1 and P2 is produced by the difference, i.e., the tightening allowance, between those curvature radii of the concave portions 31 and 32 and the radii of the pipes P1 and P2. The tightening allowance and compression ratio and the like of the elastic holding body 3 will be described later.

When connecting and holding the two pipes P1 and P2 which have different diameters using the clamp C1 described above, the pair of clamp members 1 and 2 are first disassembled, and then one clamp member 2 (which has the nut 5) is arranged below the two pipes P1 and P2 and the other clamp member 1 is arranged above the two pipes P1 and P2, as shown in FIGS. 1 and 2. Next, the concave portions 31 and 32 of the elastic holding body 3 of each clamp member 1 and 2 are then aligned with the corresponding pipes P1 and P2, and a hexagonal bolt 6 is inserted from above into the through hole 41 in the reinforcing plate 4 and the through hole 33 in the elastic holding body 3 while the pair of clamp members 1 and 2 are matched up. The end of the hexagonal bolt 6 is then screwed into the nut 5 to connect the pair of clamp members 1 and 2 together (FIGS. 3 and 4). When the clamp members 1 and 2 are connected this way, each elastic holding body 3 and 3 is compressed an amount corresponding to the tightening allowance such that binding force is applied to each pipe P1 and P2 by the elastic force of the elastic holding bodies 3 and 3 and the pipes P1 and P2 are held by a strong clamping force.

Next, the dimensions of each portion of the elastic holding bodies, which are the characteristic portions of this invention, will be described.

In this example, the dimensions of each portion of the elastic holding bodies 3 and 3 are set such that the compressibility of the elastic holding bodies 3 and 3 which hold the two pipes P1 and P2 is the same for both the large diameter pipe P1 and the small diameter pipe P2.

Figure 5:
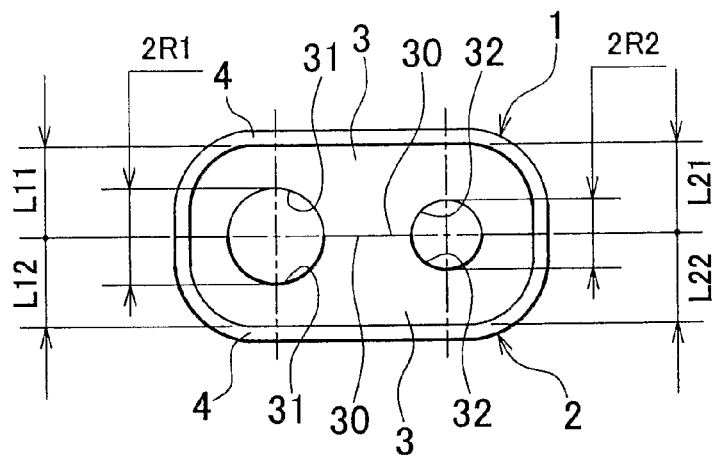
FIG. 5 is a view showing the dimensions of each portion of an elastic holding body used in the clamp shown in FIG. 1.
Figure 6:
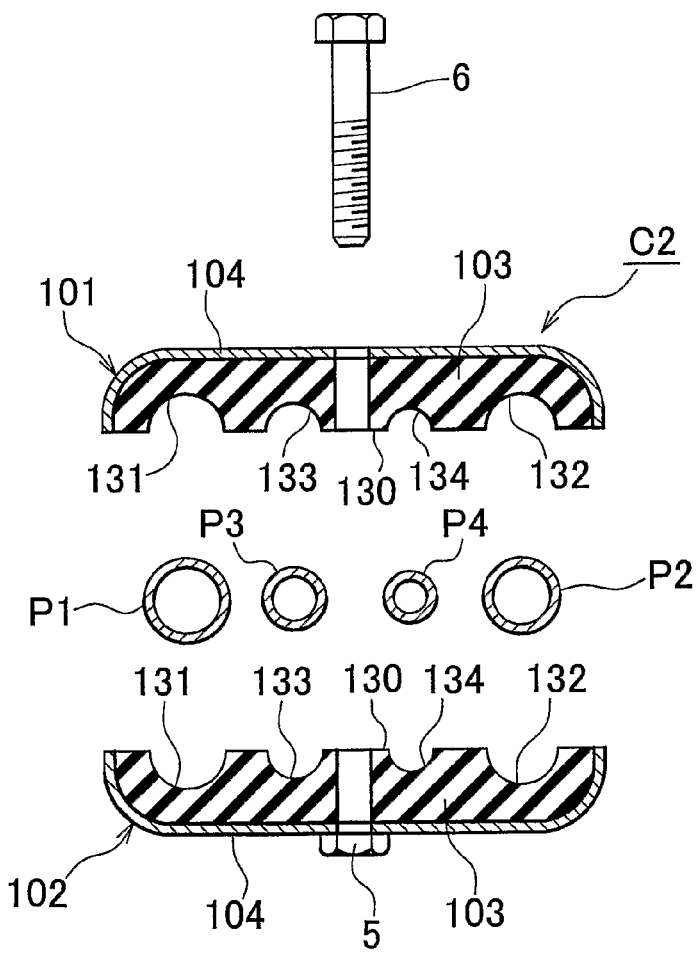
FIG. 6 is a vertical cross-sectional view illustrating a clamp according to a second exemplary embodiment of the invention in a disassembled state.
Figure 7:
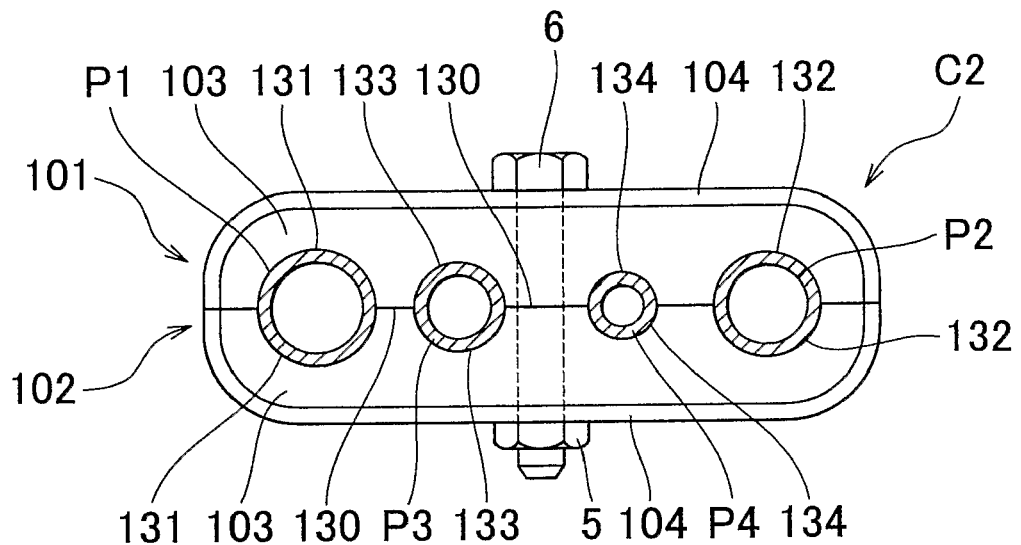
FIG. 7 is a front elevational view of the clamp shown in FIG. 6 as it is used.
Figure 8:
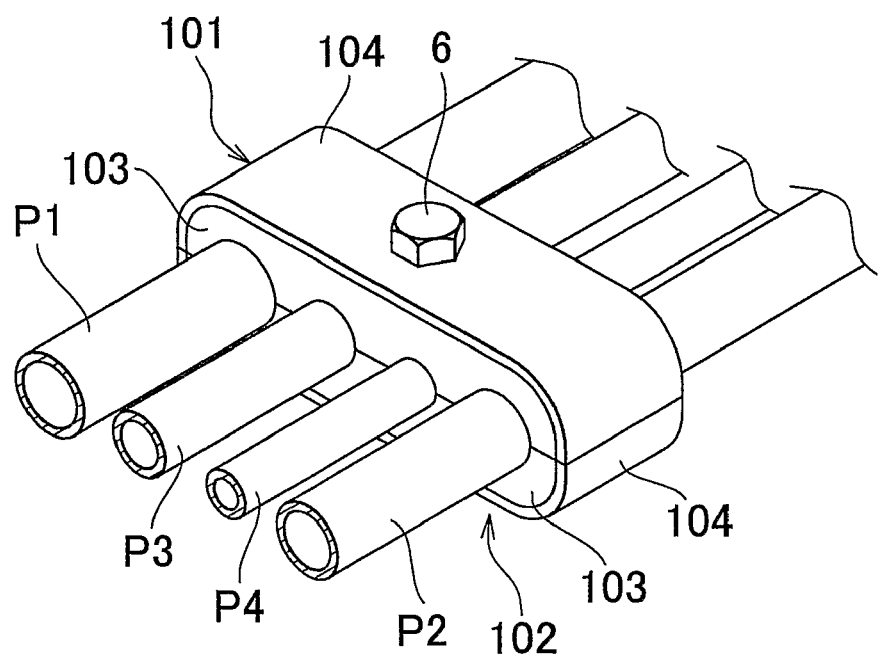
FIG. 8 is a perspective view illustrating the clamp shown in FIG. 6 as it is used.
Figure 9:
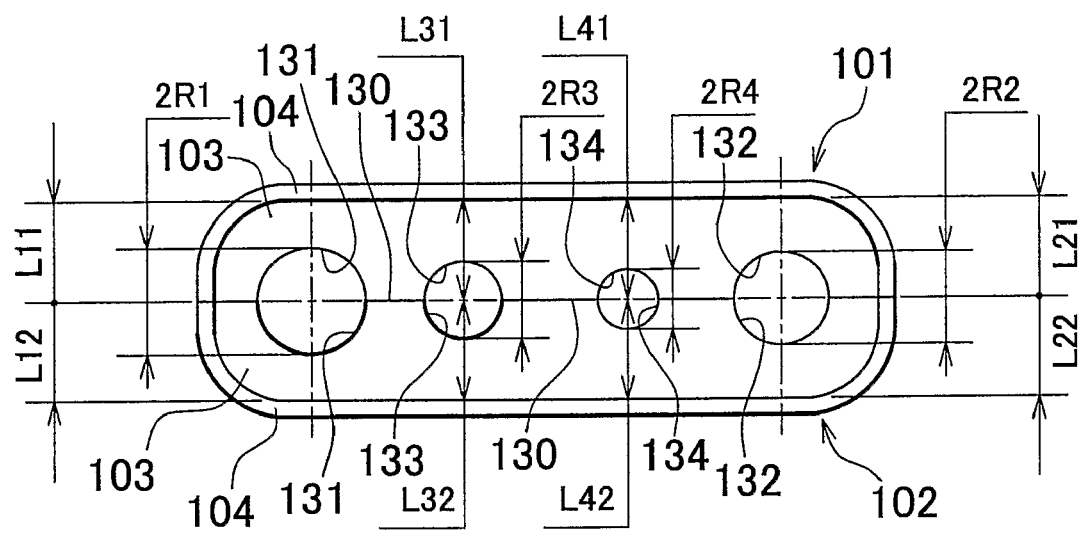
FIG. 9 is a view showing the dimensions of each portion of an elastic holding body used in the clamp shown in FIG. 6.

More specifically, if the diameter of the large diameter pipe P1 which is held by the clamp is made D1 and the diameter of the small diameter pipe P2 is made D2, and the curvature radius of the large diameter side concave portion 31 of the elastic holding body 3 is made R1, the curvature radius of the small diameter side concave portion 32 of the elastic holding body 3 is made R2, and the distances, in a direction orthogonal to the mating faces 30 of the elastic holding bodies 3 and 3 through the pipe holding center of the large diameter side concave portion 31, from the mating faces 30 of the elastic holding bodies 3 and 3 to the inner side surfaces of the reinforcing plates 4 are made L11 and L12, and similarly those distances of the small diameter side concave portions 32 are made L21 and L22, as shown in FIG. 5, the dimensions of each portion of the elastic holding bodies 3 and 3 are set such that the operational expression (1) for a compression ratio α below is satisfied.

$$\alpha = (D1-2R1)/(L11+L12-2R1) = (D2-2R2)/(L21+L22-2R2) \quad (1)$$

The numerator terms (D1−2R1) and (D2−2R2) in operational expression (1) are the tightening allowances of the elastic holding body 3.

Furthermore, because the two elastic holding bodies 3 and 3 are symmetrical in this example, L11=L12 and L21=L22. Therefore, if L11 and L12 are denoted by reference character L1, and L21 and L22 are denoted by reference character L2, and D1=2r1 and D2=2r2, the foregoing operational expression (1) for the compression ratio α can be expressed as α=(r1−R1)/(L1−R1)=(r2−R2)/(L2−R2) . . . (2). The dimensions of each portion of the elastic holding bodies 3 and 3 are set so as to satisfy this operational expression (2), such that the compression ratio of the elastic holding bodies 3 and 3 becomes the same at the large diameter pipe P1 and the small diameter pipe P2.

To explain the specific setting method, the optimal compression ratio α of the elastic holding body 3 is first determined beforehand by testing or the like. Next, the curvature radius R1 of the large diameter side concave portion 31 is determined from a recommended value of the tightening allowance (r1−R1) of the large diameter pipe P1. The distance L1 on the large diameter side is obtained by the operation expression (2) above using that curvature radius R1, the radius r1 of the large diameter pipe P1, and the compression ratio α that was determined beforehand. Then, because the distance L1 on the large diameter side is the same as the distance L2 on the small diameter side (i.e., L1=L2) in this example, the curvature radius R2 of the small diameter side concave portion 32 is obtained by the operational expression [R2=(r2−αL1)/(1−α)] converted from α=(r2−R2)/(L1−R2). Then the tightening allowance of the small diameter pipe P2 is determined (r2−R2).

In the method described above, the dimensions of each portion are obtained based on the tightening allowance of the large diameter pipe P1. Alternatively, however, the dimensions of each portion may be obtained based on the tightening allowance (i.e., the recommended value) of the small diameter pipe P2.

Also, when a structure is employed in which the distance L1 on the large diameter side and the distance L2 on the small diameter side differ, the curvature radii R1 and R2 of the concave portions 31, 32 may be determined from the recommended values of the tightening allowances (r1−R1) and (r2−R2) of the pipes P1 and P2, respectively, and the distances L1 and L2 may be obtained by the operational expression (2) using the curvature radii R1 and R2, the radii r1 and r2 of the pipes P1 and P2, and the compression ratio α.

Making the compression ratio of the elastic holding body 3 the same for both the large diameter pipe P1 and the small diameter pipe P2 using the calculations and settings described above prevents too much or too little stress from being applied to the pipes P1 and P2 when clamped, such that the pipes P1 and P2 can be held with the appropriate amount of clamping force. Furthermore, even if settling of the elastic holding body 3 occurs due to deterioration over time, the decrease in binding force caused by that settling of the elastic holding body 3 will be uniform at both of the pipes P1 and P2 so the clamp hold will not loosen.

Second Embodiment

The above example describes a clamp which holds two pipes P1 and P2. The invention is not limited to this, however, i.e., the number of pipes connected and held may alternatively be three or more. For example, the invention may also be applied to a clamp C2 which connects and holds four pipes P1 to P4 having different diameters, as described in a second exemplary embodiment illustrated in FIGS. 6 to 9.

In this case, when the diameters of the pipes P1, P2, P3, and P4 which are held by the clamp are made D1, D2, D3, and D4, respectively, and the curvature radius of each concave portion 131, 132, 133, and 134 of an elastic holding body 103 of each clamp member 101 and 102 is made R1, R2, R3, and R4, respectively, and the distances from mating faces 130 of the elastic holding bodies 103 and 103 to the inner side surfaces of reinforcing plates 104 are made L11, 12, . . . , L41, and L42, respectively, then the dimensions of each portion of the elastic holding bodies 103 and 103 are set to satisfy operational expression (3) for the compressibility α below.

$$\alpha = (D1-2R1)/(L11+L12-2R1) = (D2-2R2)/(L21+L22-2R2) = (D3-2R3)/(L31+L32-2R3) = (D4-2R4)/(L41+L42-2R4) \quad (3)$$

Moreover, in this example, when the two elastic holding bodies 103 and 103 are symmetrical, then L11=L12, . . . , and L41=L42. Therefore, if L11 and L12 are denoted by reference character L1, L21 and L22 are denoted by reference character L2, L31 and L32 are denoted by reference character L3, L41 and L42 are denoted by reference character L4, and the radii of the pipes P1, P2, P3, and P4 are denoted by reference characters r1, r2, r3, and r4, respectively, then the operational expression (3) for the compression ratio α above can be expressed as α=(r1−R1)/(L1 −R1)=(r2−R2)/(L2−R2)=(r3−R3)/(L3−R3)=(r4−R4)/(L4−R4) . . . (4). The dimensions of each portion of the elastic holding bodies 103 and 103 may also be set to satisfy this operational expression (4).

When the pair of elastic holding bodies are symmetrical and the dimensions of each portion are defined as in the operational expressions (2) and (4) above, the general equation for holding n number of pipes can be expressed as follows.

$$\alpha = (r1-R1)/(L1-R1) = (r2-R2)/(L2-R2) = \ldots = (rn-Rn)/(Ln-Rn) \quad (5)$$

Third Embodiment

Figure 10:
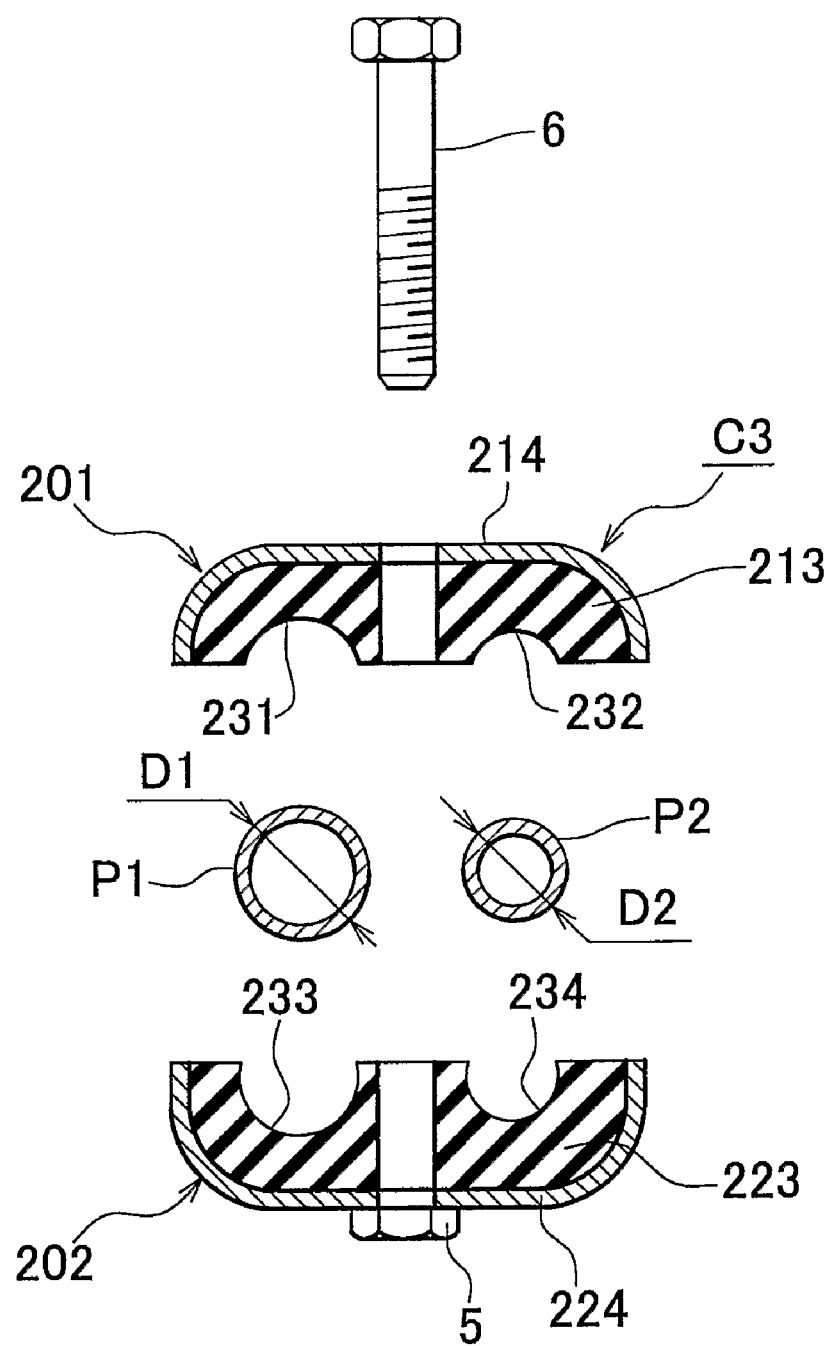
FIG. 10 is a vertical cross-sectional view illustrating a clamp according to a third exemplary embodiment of the invention in a disassembled state.
Figure 11:
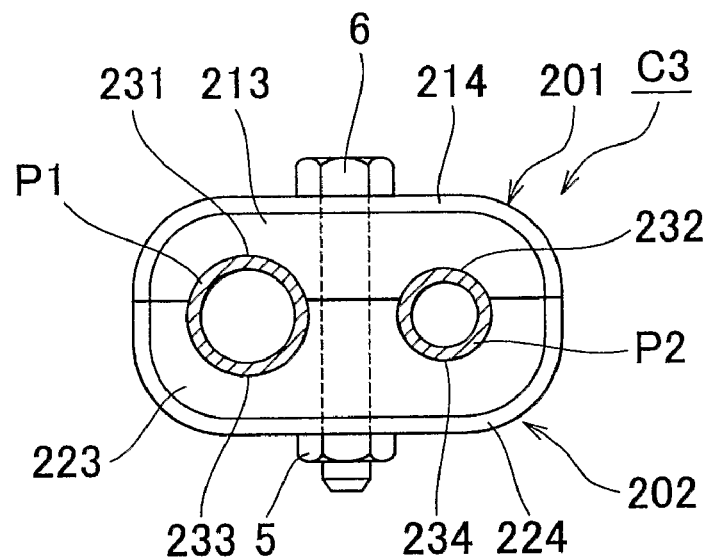
FIG. 11 is a front elevational view of the clamp shown in FIG. 10 as it is used.
Figure 12:
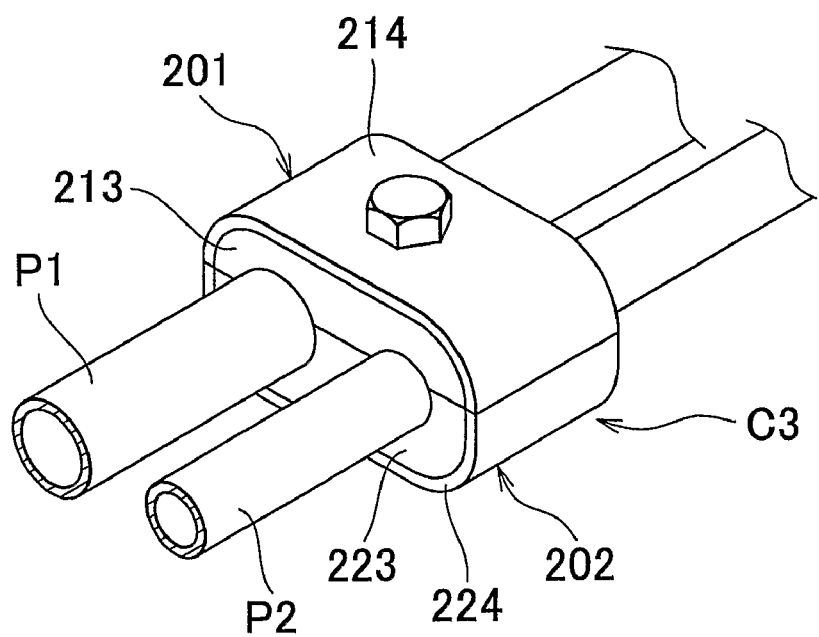
FIG. 12 is a perspective view illustrating the clamp shown in FIG. 10 as it is used.

FIG. 10 is a vertical cross-sectional view illustrating a clamp according to a third exemplary embodiment of the invention in a disassembled state. FIG. 11 is a front elevational view, and FIG. 12 is a perspective view, of the clamp shown in FIG. 10 as it is used.

Clamp C3 in this example is characterised in that, in the structure shown in FIGS. 1 to 5 described above, elastic holding bodies 213 and 223 as well as reinforcing portions 214 and 224 of a pair of clamp members 201 and 202 are asymmetrical with respect to one another, and the distance L11 (see FIG. 13) of one of the elastic holding bodies 213 (i.e., the elastic holding body on the upper side in FIG. 10) is shorter than the distance L12 (see FIG. 13) of the other elastic holding body 223 (i.e., the elastic holding body on the lower side in FIG. 10). The other structure is the same as that of clamp C1 shown in FIGS. 1 to 5.

Figure 13:
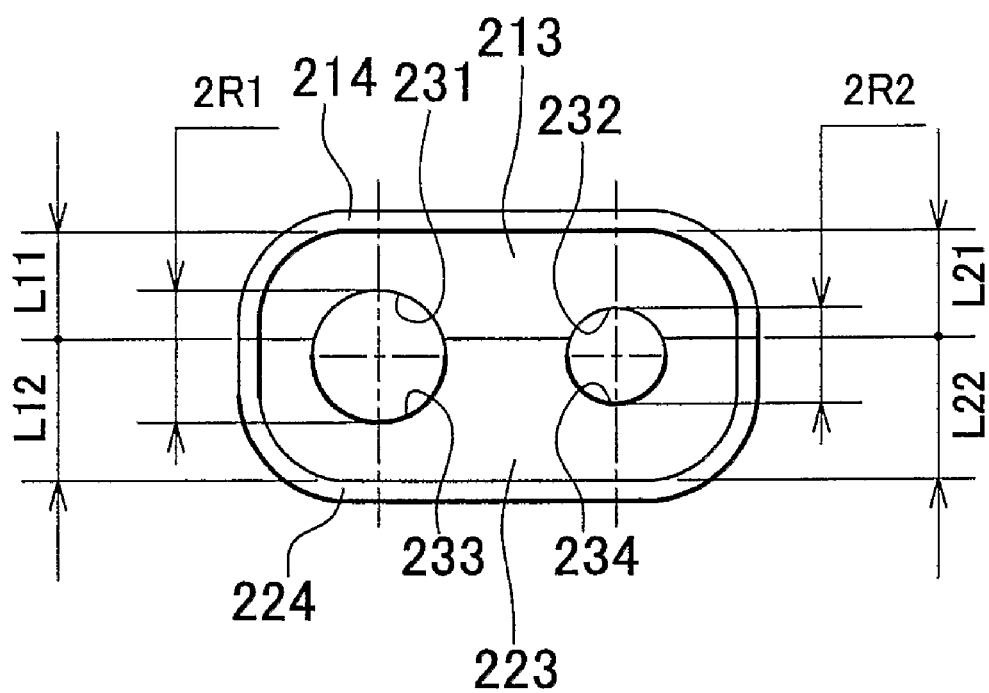
FIG. 13 is a view showing the dimensions of each portion of an elastic holding body used in the clamp shown in FIG. 10.

In this way, even if the pair of elastic holding bodies 213 and 223 are asymmetrical and the concave portions 231 and 232 and the concave portions 233 and 234 are also asymmetrical, the overall compression ratio when the two elastic holding bodies 213 and 223 are matched up is such that, when the dimensions of each portion are defined as illustrated in FIG. 13, the compression ratio on the large diameter pipe P1 side can be expressed as $[\alpha=(D1-2R1)/(L11+L12-2R1)]$ and the compression ratio on the small diameter pipe P2 side can be expressed as $[\alpha=(D2-2R2)/(L21+L22-2R2)]$.

Accordingly, even in this example, the dimensions of each portion of the elastic holding bodies 213 and 223 may be set such that the operational expression for compression ratio $[\alpha=(D1-2R1)/(L11+L12-2R1)=(D2-2R2)/L21+L22-2R2]$ ... (1)] is satisfied, such that the compression ratio of the elastic holding bodies 213 and 223 becomes the same at both the large diameter pipe P1 and the small diameter pipe P2.

In each of the above examples, the pair of clamp members are separate bodies, but the invention is not limited to this. That is, the pair of clamp members may be an integrated structure in which they are connected via a hinge or the like, such that they connect and hold a plurality of pipes by opening and closing.

Here, the invention is not limited to a clamp that connects and holds pipes for an automobile, such as fuel pipes and brake pipes in an automobile. To the contrary, the invention may also be applied to a clamp that connects and holds other various types of pipes used in objects aside from automobiles. The clamp of this invention can be used for connecting and holding pipes through which fluid flows in a fuel system, brake system, or cooling system or the like in an automobile or the like. In particular, the clamp of the invention can effectively be used to connect and hold a plurality of pipes having different diameters.

The invention claimed is:

1. A clamp having a pair of clamp members which sandwich at least two pipes having cylindrical cross-sections of different diameters, each of the clamp members including an elastic body having at least two concave portions and a reinforcing plate fixed to an outer side surface of the elastic body, the clamp structured to hold the at least two concave portions by aligning the pair of clamp members while the at least two pipes are arranged in the concave portions of the elastic bodies, wherein, when diameters of the at least two pipes are denoted by reference characters D1 and D2, curvature radiuses of the concave portions which hold the first and second pipes are denoted by reference characters R1 and R2, and distances, in a direction orthogonal to mating faces of the elastic bodies through pipe holding centers of the concave portions, from the mating faces of the elastic bodies to inner side surfaces of a pair of reinforcing plates are denoted by reference characters L11 and L12, respectively, for the first pipe, and L21 and L22, respectively, for the second pipe, and the compression ratio of the elastic bodies satisfies the relationship $[(D1-2R1)/(L11+L12-2R1)=(D2-2R2)/(L21+L22-2R2)]$.

2. The clamp according to claim 1, wherein the elastic body is rubber.

3. The clamp according to claim 1, wherein the elastic bodies and the reinforcing plates of the pair of clamp members are asymmetrical with respect to one another.

4. The clamp according to claim 1, wherein the clamp connects and holds pipes for an automobile.

* * * * *